United States Patent
Umemiya et al.

(10) Patent No.: US 10,386,265 B2
(45) Date of Patent: Aug. 20, 2019

(54) ESTIMATING METHOD, INFORMATION PROCESSING DEVICE, AND NON-TRANSITORY COMPUTER-READABLE RECORDING MEDIUM STORING ESTIMATING PROGRAM

(71) Applicant: FUJITSU LIMITED, Kawasaki-shi, Kanagawa (JP)

(72) Inventors: Shigeyoshi Umemiya, Fujisawa (JP); Hironobu Kitajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/810,260

(22) Filed: Nov. 13, 2017

(65) Prior Publication Data
US 2018/0149555 A1  May 31, 2018

(30) Foreign Application Priority Data
Nov. 30, 2016  (JP) ................. 2016-233134

(51) Int. Cl.
| G01P 13/00 | (2006.01) |
| G01M 5/00 | (2006.01) |
| G01H 13/00 | (2006.01) |
| G01M 17/007 | (2006.01) |

(52) U.S. Cl.
CPC .......... *G01M 5/0066* (2013.01); *G01H 13/00* (2013.01); *G01M 5/0008* (2013.01); *G01M 5/0033* (2013.01); *G01M 17/007* (2013.01); *G01P 13/00* (2013.01)

(58) Field of Classification Search
CPC ............ G01M 5/0066; G01M 5/0008; G01M 5/0033; G01M 17/007; G01H 13/00; G01P 13/00
See application file for complete search history.

(56) References Cited

FOREIGN PATENT DOCUMENTS

JP  2012-208043  10/2012

OTHER PUBLICATIONS

Yoshioka et al., "A study on the vibration characteristics change of the steel truss bridge by the real damage of diagonal member", Journal of Structural Engineering, Japan Society of Civil Engineers, Mar. 2008, vol. 54A, pp. 199-208 (13 pages), with partial English Translation.

*Primary Examiner* — Jamel E Williams
(74) *Attorney, Agent, or Firm* — Fujitsu Patent Center

(57) ABSTRACT

An estimating method, includes: generating, by a computer, a plurality of frequency spectra based on data measured during movement on a structure at a plurality of speeds; identifying a range of a natural frequency of the structure based on the plurality of frequency spectra; and calculating the natural frequency based on one or more dominant frequencies included in the range among dominant frequencies of the plurality of frequency spectra and speeds when the one or more dominant frequencies included in the range are measured.

20 Claims, 18 Drawing Sheets

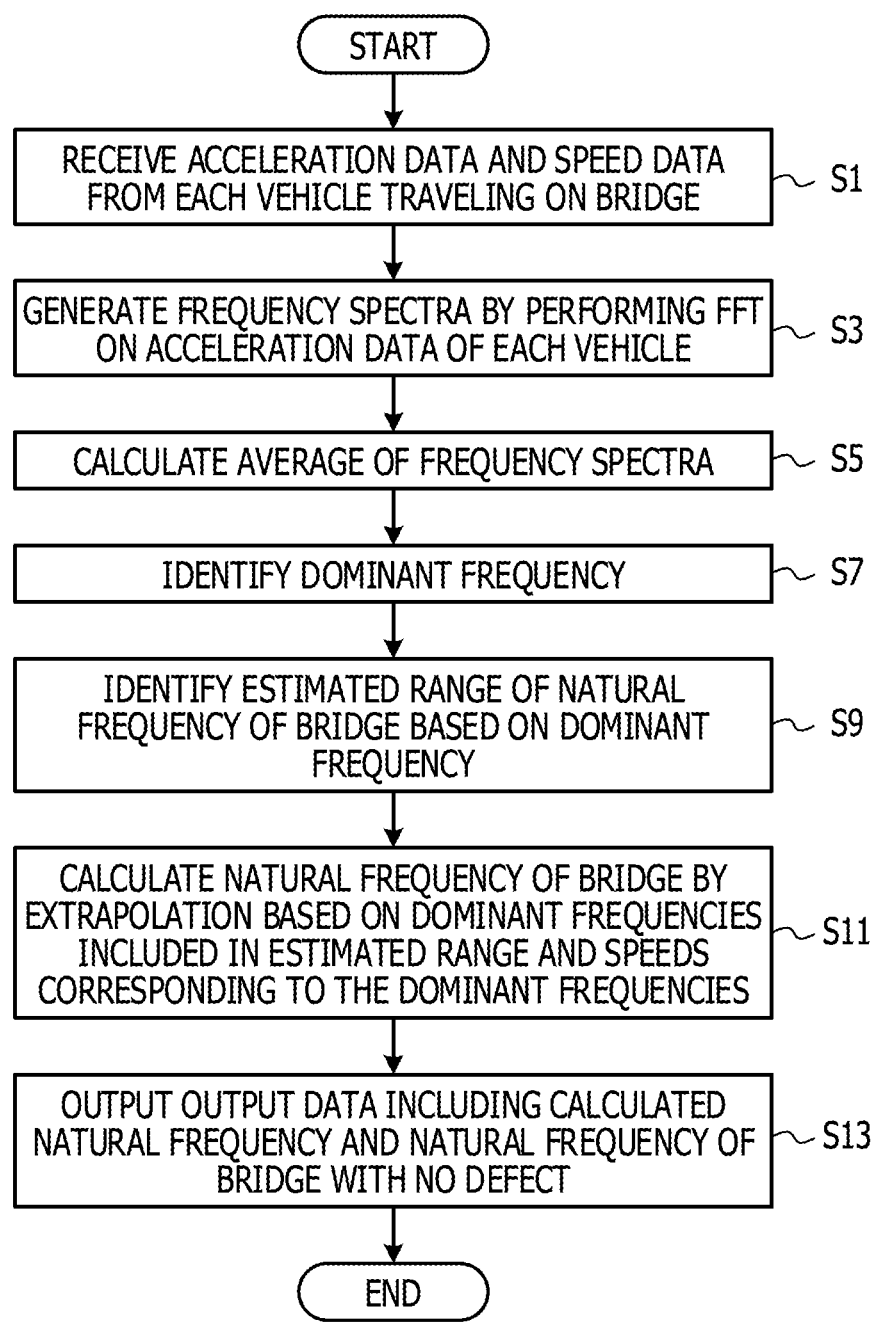

FIG. 9

| DOMINANT FREQUENCY |
|---|
| 3.13 |

FIG. 10

| ESTIMATED RANGE OF NATURAL FREQUENCY |
|---|
| $2.93 \leqq f \leqq 3.33$ |

FIG. 11

| NATURAL FREQUENCY |
|---|
| 2.902 |

FIG. 13

|  | SPEED (km/h) | DOMINANT FREQUENCY (Hz) |
|---|---|---|
| VEHICLE 3a | 60 | 3.13 |
| VEHICLE 3b | 40 | 3.08 |
| VEHICLE 3c | 20 | 2.98 |

US 10,386,265 B2

ESTIMATING METHOD, INFORMATION PROCESSING DEVICE, AND NON-TRANSITORY COMPUTER-READABLE RECORDING MEDIUM STORING ESTIMATING PROGRAM

CROSS-REFERENCE TO RELATED APPLICATION

This application is based upon and claims the benefit of priority of the prior Japanese Patent Application No. 2016-233134, filed on Nov. 30, 2016, the entire contents of which are incorporated herein by reference.

FIELD

The embodiment discussed herein is related to a structure inspection technology.

BACKGROUND

A structure such as a bridge is inspected.

A related technology is disclosed in Japanese Laid-open Patent Publication No. 2012-208043 or Non-Patent Document: Tsutomu Yoshioka, Masahiko Harada, Hiroki Yamaguchi, and Shin Itou, "A study on the vibration characteristics change of the steel truss bridge by the real damage of diagonal member," Journal of Structural Engineering, (Japan), Japan Society of Civil Engineers, March 2008, VOL. 54A, pp. 199-208.

SUMMARY

According to an aspect of the embodiment, an estimating method includes: generating, by a computer, a plurality of frequency spectra based on data measured during movement on a structure at a plurality of speeds; identifying a range of a natural frequency of the structure based on the plurality of frequency spectra; and calculating the natural frequency based on one or more dominant frequencies included in the range among dominant frequencies of the plurality of frequency spectra and speeds when the one or more dominant frequencies included in the range are measured.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of processing performed by an information processing device;
FIG. 9 illustrates an example of data stored in a natural frequency data storage unit;
FIG. 10 illustrates an example of data stored in a natural frequency data storage unit;
FIG. 11 illustrates an example of data stored in a natural frequency data storage unit;
FIG. 13 illustrates an example of calculation of a natural frequency.

DESCRIPTION OF EMBODIMENT

The soundness of a structure such as a bridge is evaluated based on data measured for a certain period by a sensor such as an acceleration sensor, or a strain sensor installed on the structure. However, the installation and removal of the sensor involve much labor, and it takes time to complete the evaluation.

A sensor is installed in a vehicle traveling on a structure, rather than being installed on the structure, to evaluate the soundness of the structure. For example, a railway vehicle to which an accelerometer is attached travels on rails of the structure. The traveling is performed a plurality of times at different speeds. A running spectrum (frequency spectrum) is calculated based on acceleration data measured during the traveling. A dominant frequency that does not change depending on the speed of the railway vehicle is extracted as a natural frequency of the structure.

However, the vibration characteristics of the structure may differ depending on a shift in excitation frequency provided by the railway vehicle and a change in amplitude dependence of natural frequency, and the dominant frequency may change depending on the speed of the railway vehicle. For example, a change in natural frequency which change occurs due to damage to the structure is very small. It is thus difficult to determine whether a change in the dominant frequency measured is caused by the damage or a change in the speed.

A technology that improves accuracy of estimation of the natural frequency of a structure, for example, may be provided.

Figure 1:
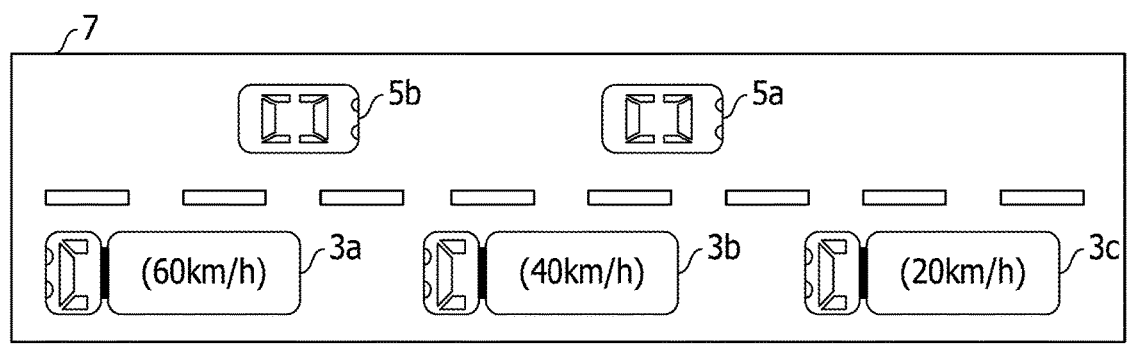
FIG. 1 illustrates an example of a measuring method.

FIG. 1 illustrates an example of a measuring method. As illustrated in FIG. 1, the natural frequency of a structure is estimated based on data measured by acceleration sensors and speed sensors mounted in a plurality of vehicles 3a to 3c traveling at different speeds. The structure in FIG. 1 is, for example, a bridge 7. The vehicle 3a travels at 60 kilometers per hour (km/h). The vehicle 3b travels at 40 kilometers per hour (km/h). The vehicle 3c travels at 20 kilometers per hour (km/h). Vehicles such as vehicles 5a and 5b travel in an opposite lane from a lane where the vehicles 3a to 3c travel.

Figure 2:
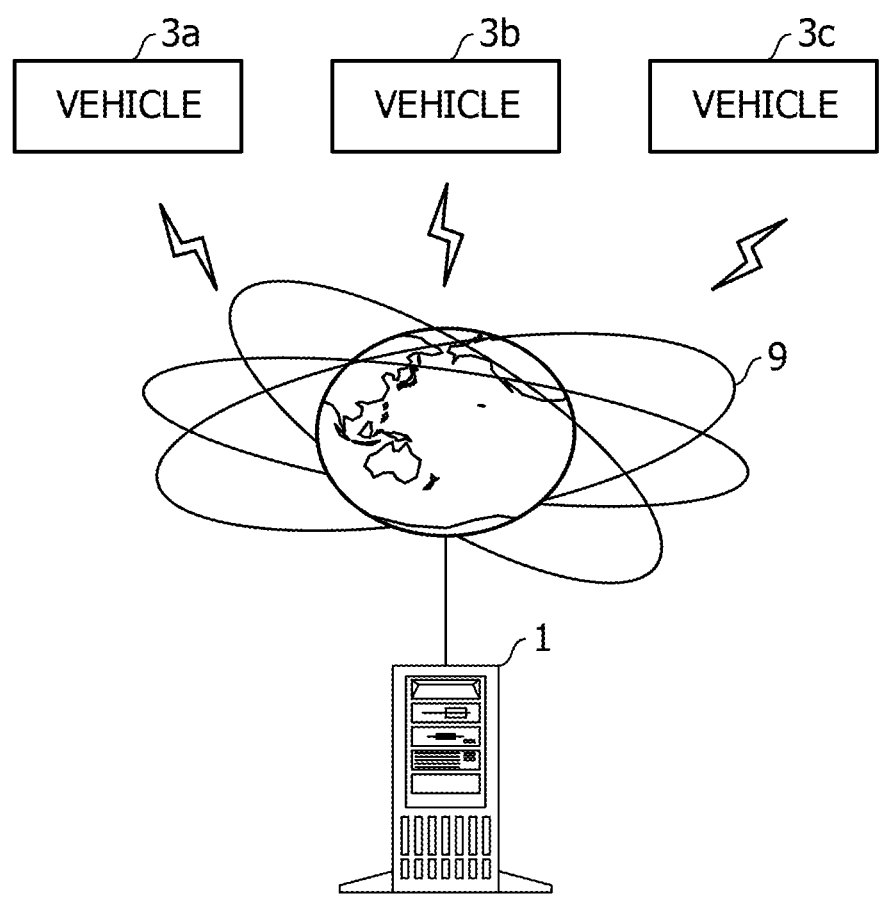
FIG. 2 illustrates an example of a network configuration.

FIG. 2 illustrates an example of a network configuration. The vehicles 3a to 3c, for example, transmit measured data to an information processing device 1 via a network 9 such as the Internet. The information processing device 1 may, for example, be a physical server. The information processing device 1 performs processing based on the data received, and outputs a result of the processing on a display device of the information processing device 1 or the like. The destination of the output may also be a terminal operated by a person carrying out inspection of the bridge 7 or the like.

Figure 3:
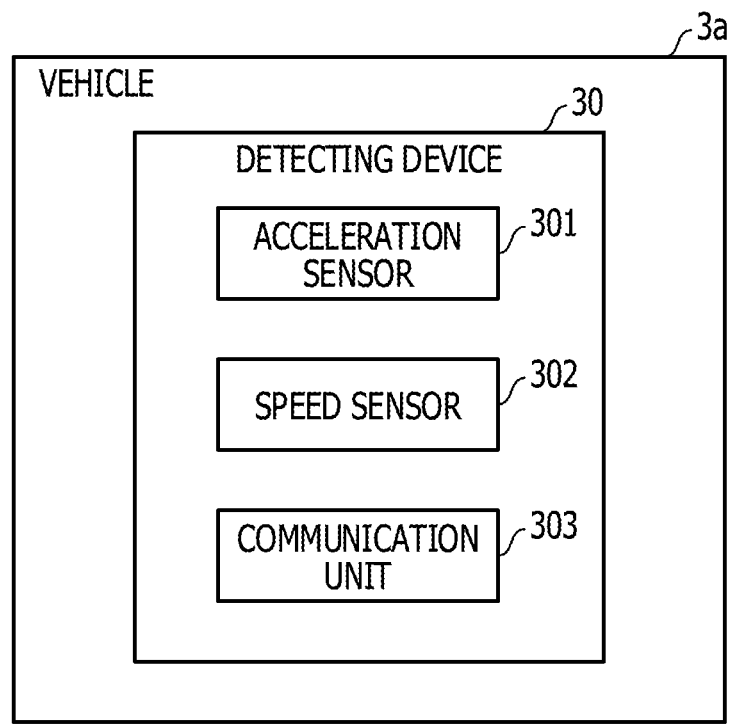
FIG. 3 illustrates an example of a configuration of detecting device in a vehicle.

FIG. 3 illustrates an example of a configuration of detecting device 30 in a vehicle. The vehicle 3a is provided with a detecting device 30. The detecting device 30 includes: an acceleration sensor 301 that measures acceleration in a vertical direction; a speed sensor 302 that measures the speed of the vehicle 3a; and a communicating unit 303. Incidentally, the configurations of the vehicles 3b and 3c may be similar to the configuration of the vehicle 3a.

The acceleration sensor 301 periodically measures acceleration and generates acceleration data. The speed sensor 302 periodically measures speed and generates speed data. A speedometer as mounted in the vehicle may be used. The communicating unit 303 transmits the generated acceleration data and the generated speed data to the information processing device 1.

Figure 4:
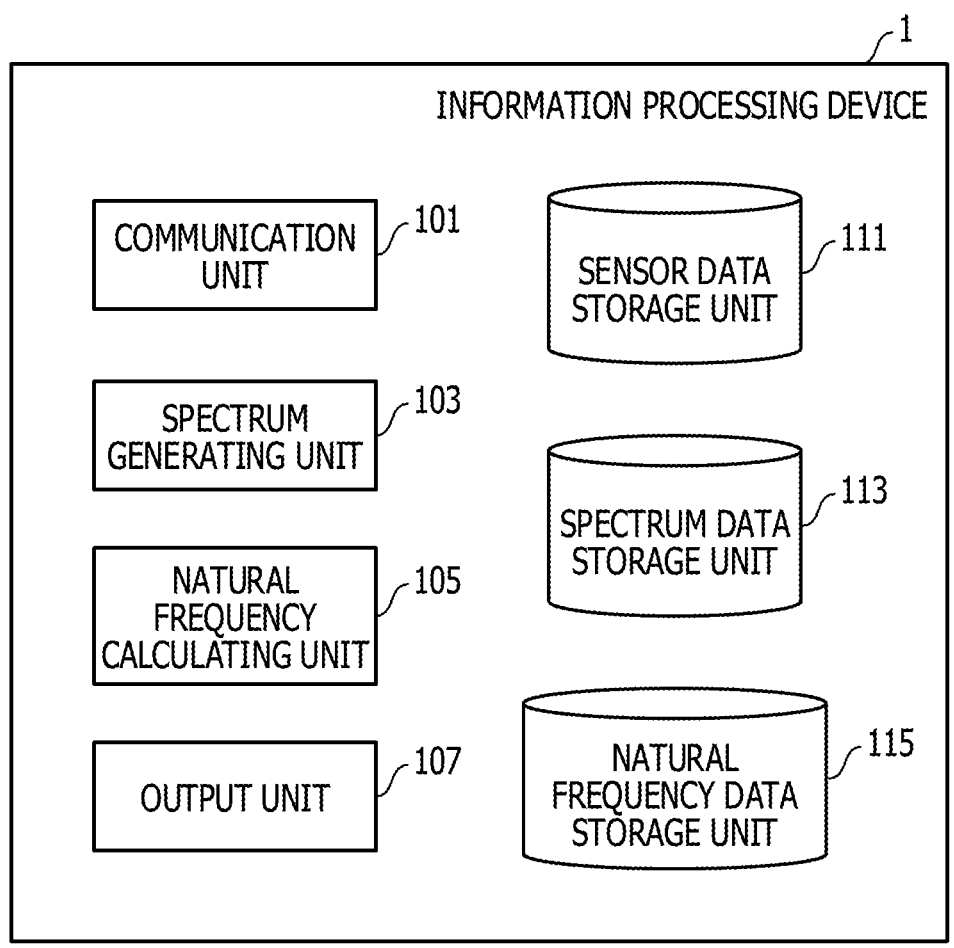
FIG. 4 illustrates an example of functional blocks of an information processing device.

FIG. 4 illustrates an example of functional blocks of an information processing device. The information processing device 1 includes a communicating unit 101, a spectrum generating unit 103, a natural frequency calculating unit 105, an output unit 107, a sensor data storage unit 111, a spectrum data storage unit 113, and a natural frequency data storage unit 115.

The communicating unit 101 stores data received from the vehicles 3a to 3c, for example, the acceleration data and the speed data, in the sensor data storage unit 111. The spectrum generating unit 103 generates the data of a frequency spectrum based on the data stored in the sensor data storage unit 111, and stores the generated data in the spectrum data storage unit 113. The natural frequency calculating unit 105 calculates the natural frequency of the bridge 7 based on the data stored in the spectrum data storage unit 113, and stores the calculated natural frequency in the natural frequency data storage unit 115. The output unit 107 outputs, to the display device of the information processing device 1, output data including the frequency stored in the natural frequency data storage unit 115 and the natural frequency of the bridge 7 with no defect, for example, a natural frequency as a physical property value.

Figure 16:
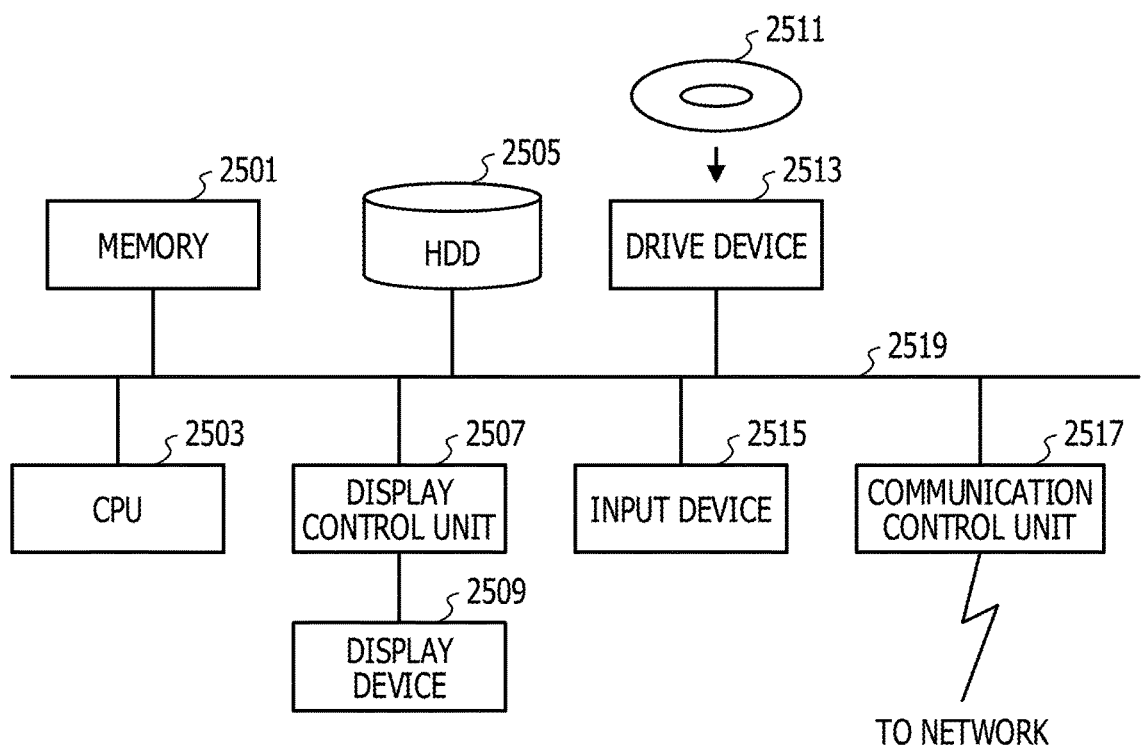
FIG. 16 illustrates an example of a hardware configuration of a computer.

The communicating unit 101, the spectrum generating unit 103, the natural frequency calculating unit 105, and the output unit 107 may be implemented when a program for performing measurement processing is loaded into a memory, for example, a memory 2501 illustrated in FIG. 16, and is executed by a processor, for example, a central processing unit (CPU) 2503 illustrated in FIG. 16. The sensor data storage unit 111, the spectrum data storage unit 113, and the natural frequency data storage unit 115 may be implemented by using a memory, for example, the memory 2501 illustrated in FIG. 16, and another storage device, for example, an hard disk drive (HDD) 2505 illustrated in FIG. 16.

The vehicle 3a travels on the bridge 7 at 60 kilometers per hour (km/h). The vehicle 3b travels on the bridge 7 at 40 kilometers per hour (km/h). The vehicle 3c travels on the bridge 7 at 20 kilometers per hour (km/h). The communicating units 303 of the vehicles 3a to 3c transmit acceleration data and speed data measured during the traveling to the information processing device 1. In response to this, the communicating unit 101 of the information processing device 1 receives the acceleration data and the speed data from the vehicles 3a to 3c (for example, operation S1 illustrated in FIG. 5), and stores the acceleration data and the speed data in the sensor data storage unit 111.

Figure 6A:
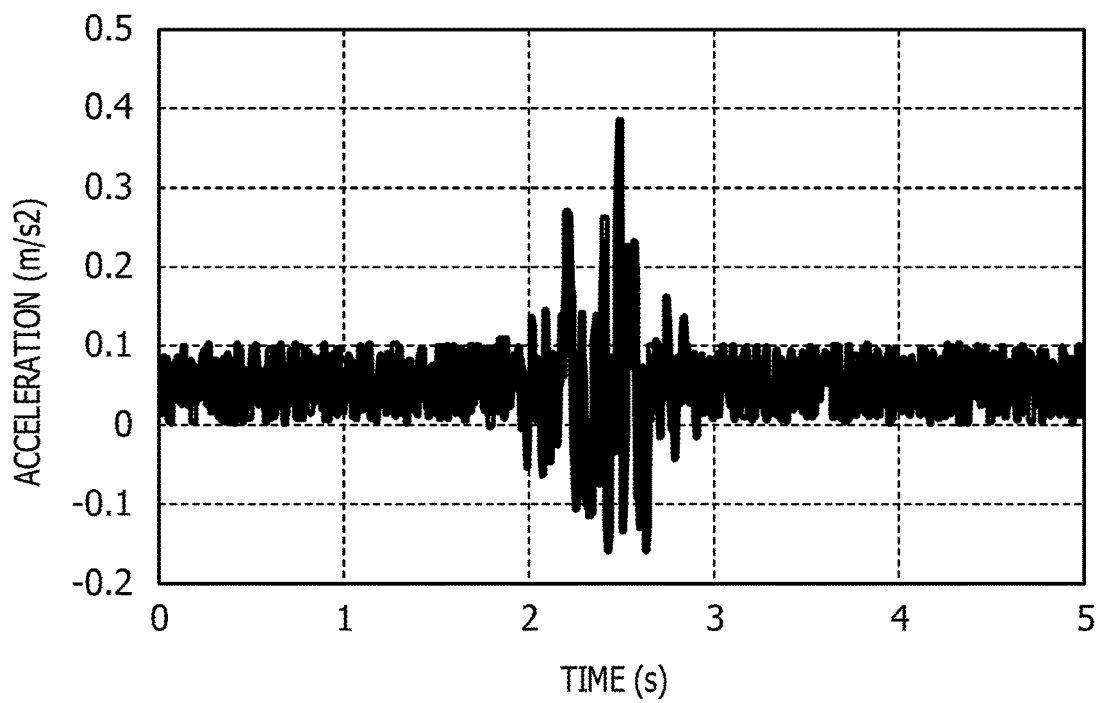
FIGS. 6A to 6C illustrate an example of data stored in a sensor data storage unit.
Figure 6B:
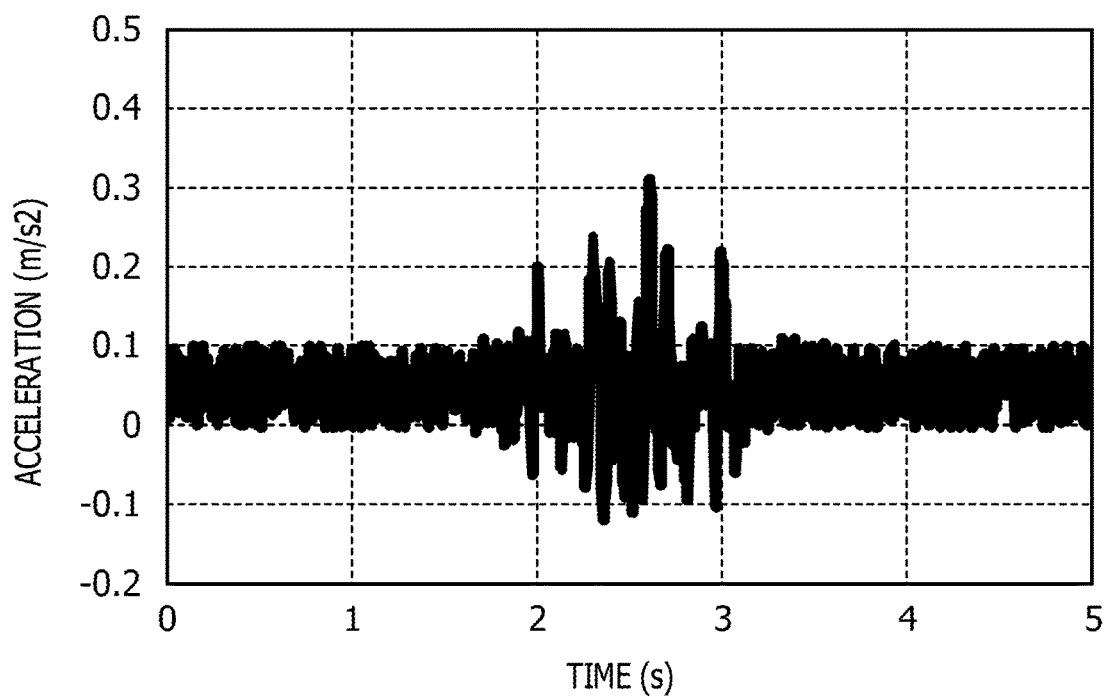
Figure 6C:
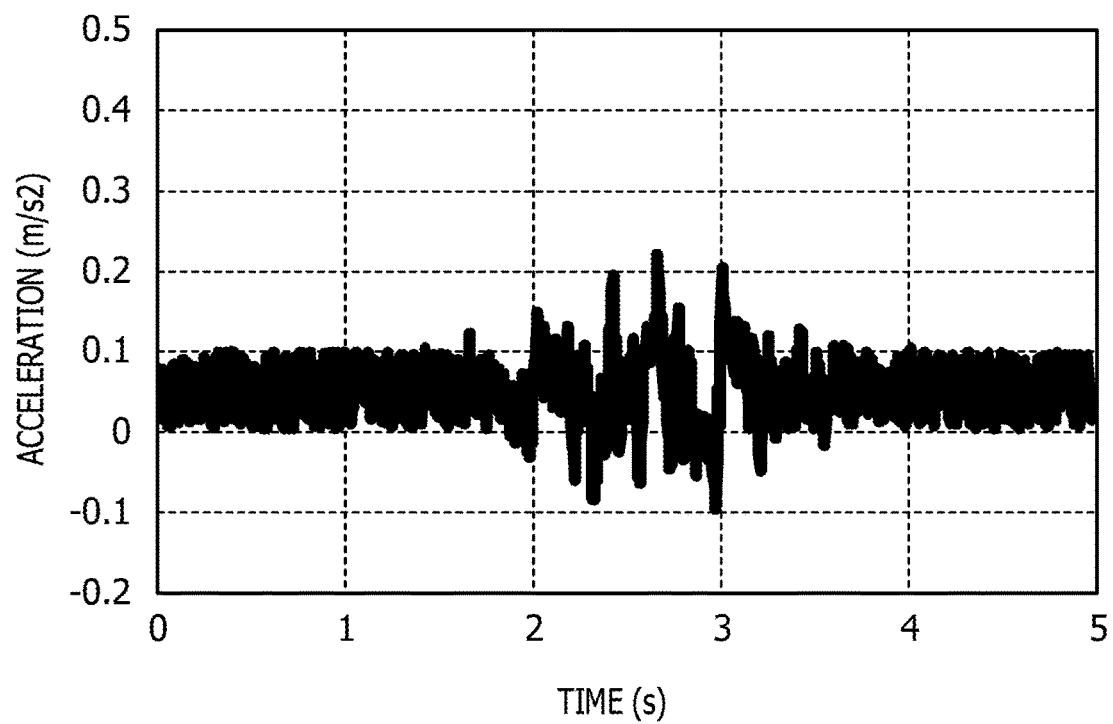

FIGS. 6A to 6C illustrate an example of the data stored in a sensor data storage unit. In FIGS. 6A to 6C, an axis of ordinates indicates acceleration (m/s$^2$), and an axis of abscissas indicates time (s). FIG. 6A illustrates the acceleration data of the vehicle 3a. FIG. 6B illustrates the acceleration data of the vehicle 3b. FIG. 6C illustrates the acceleration data of the vehicle 3c.

The speed data of the vehicle 3a indicates a speed of 60 kilometers per hour (km/h). The speed data of the vehicle 3b indicates a speed of 40 kilometers per hour (km/h). The speed data of the vehicle 3c indicates a speed of 20 kilometers per hour (km/h).

The spectrum generating unit 103 generates frequency spectra by performing fast Fourier transformation (FFT) on the acceleration data of the respective vehicles stored in the sensor data storage unit 111 (operation S3). The spectrum generating unit 103 stores data of the generated frequency spectra in the spectrum data storage unit 113. The frequency spectra may be generated by a method other than FFT. For example, another method of transforming time series data into a frequency spectrum, such as wavelet transformation, may be used.

Figure 7A:
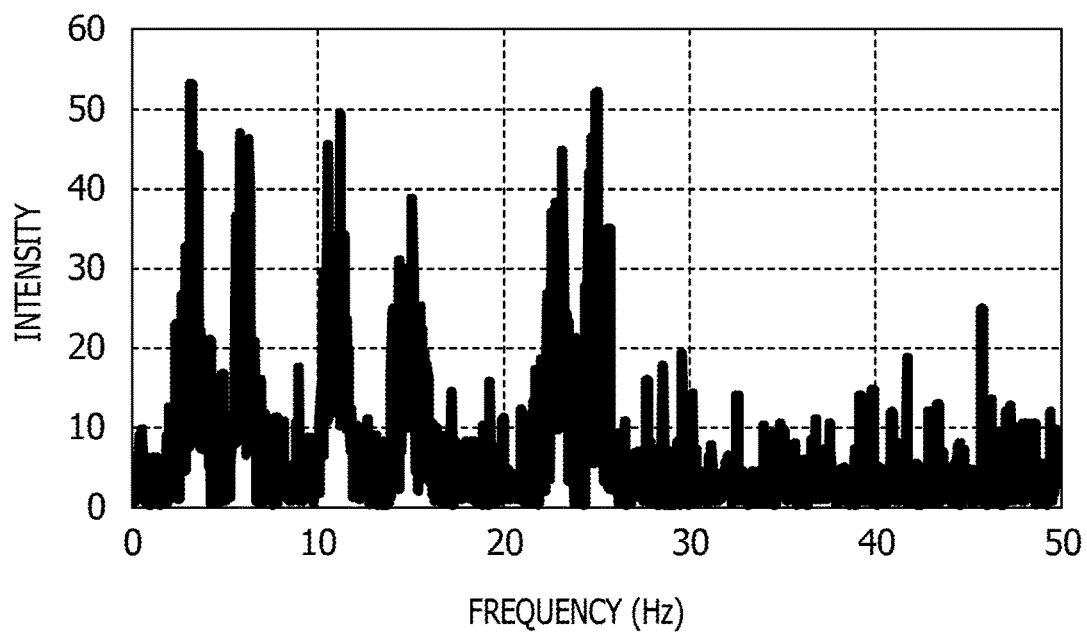
FIGS. 7A to 7C illustrate an example of frequency spectra.
Figure 7B:
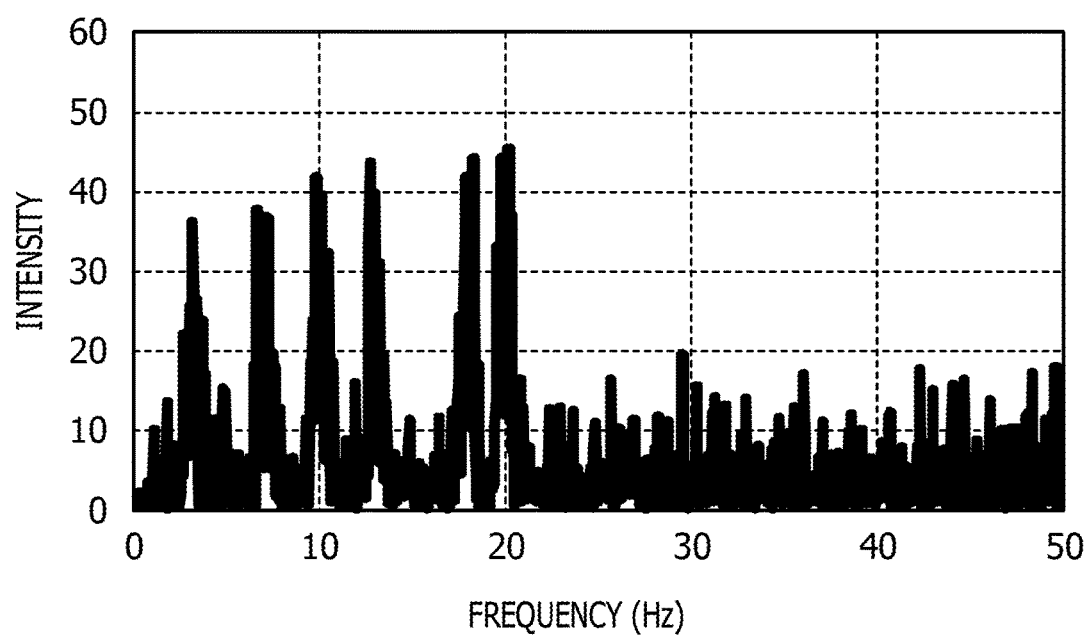
Figure 7C:
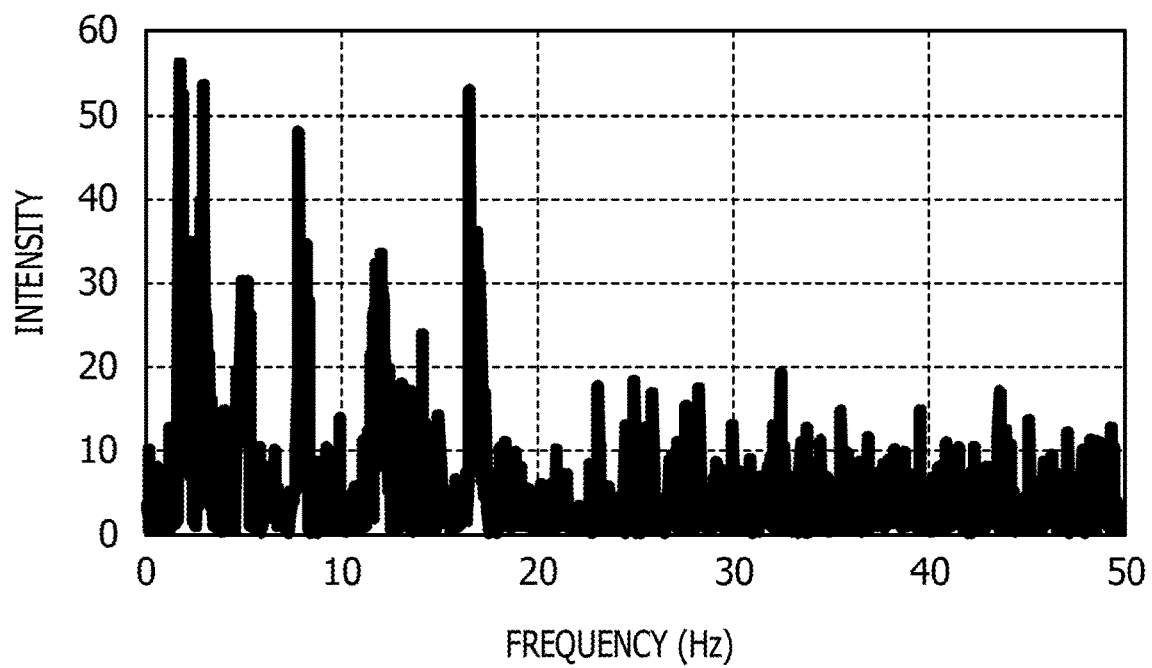

FIGS. 7A to 7C illustrate an example of data stored in a spectrum data storage unit. In FIGS. 7A to 7C, an axis of ordinates indicates spectral intensity, and an axis of abscissas indicates frequency (Hz). FIG. 7A illustrates a frequency spectrum generated by performing FFT on the acceleration data of FIG. 6A. FIG. 7B illustrates a frequency spectrum generated by performing FFT on the acceleration data of FIG. 6B. FIG. 7C illustrates a frequency spectrum generated by performing FFT on the acceleration data of FIG. 6C.

The natural frequency calculating unit 105 calculates an average of the plurality of frequency spectra generated in operation S3 (operation S5), and stores the calculated average in the spectrum data storage unit 113. While the average is calculated in operation S5, a sum total may be calculated.

Figure 8:
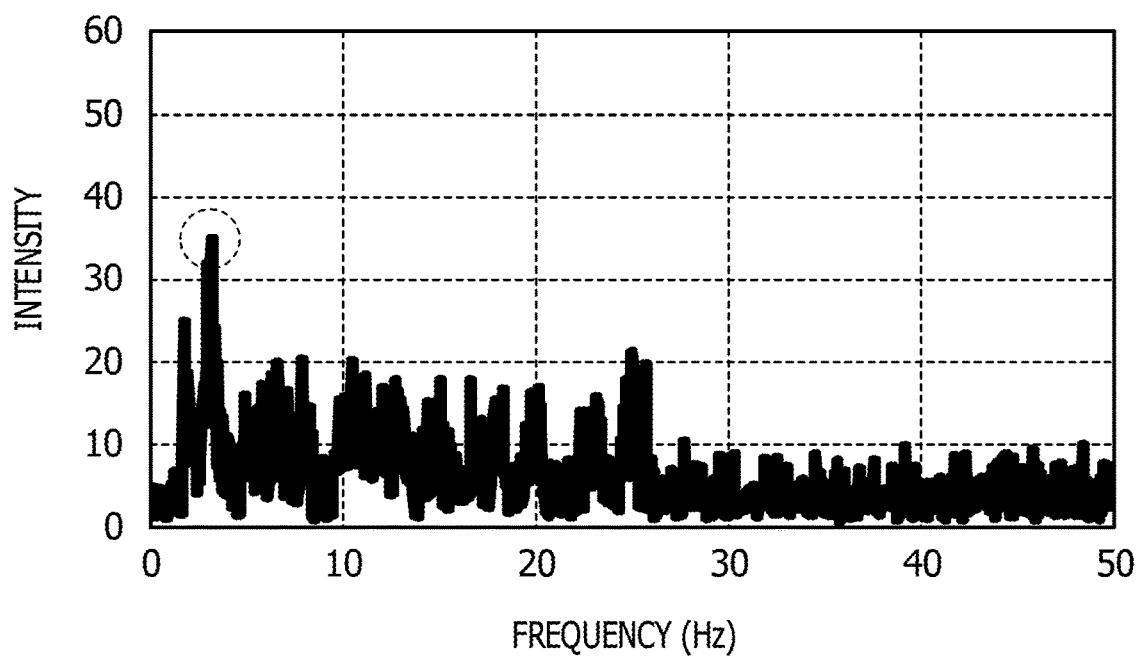
FIG. 8 illustrates an example of an average of frequency spectra.

FIG. 8 illustrates an example of an average of frequency spectra. FIG. 8 illustrates an average of the frequency spectrum of FIG. 7A, the frequency spectrum of FIG. 7B, and the frequency spectrum of FIG. 7C. The calculation of the average decreases the values of peaks of frequencies originating from disturbances, for example, vibrations caused by the vehicles 5a and 5b traveling in the opposite lane, a change in the state of a road surface, and the like, whereas a peak of the natural frequency of the bridge 7 appears in each of the frequency spectra and thus remains as it is.

Figure 9:
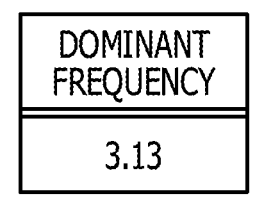

The natural frequency calculating unit 105 identifies a dominant frequency based on the average calculated in operation S5 (operation S7). The natural frequency calculating unit 105 stores the identified dominant frequency in the natural frequency data storage unit 115. The natural frequency data storage unit 115 stores the dominant frequency as illustrated in FIG. 9, for example. FIG. 9 illustrates an example of data stored in a natural frequency data storage unit.

In operation S7, a frequency corresponding to a maximum spectral intensity is identified as the dominant frequency. In FIG. 8, a frequency corresponding to a peak included in a broken line circle is identified as the dominant frequency.

The natural frequency calculating unit 105 identifies an estimated range of the natural frequency of the bridge 7 based on the dominant frequency identified in operation S7 (operation S9), and stores data of the estimated range in the natural frequency data storage unit 115. In operation S9, for example, a range from a value obtained by subtracting a given value from the dominant frequency to a value obtained by adding a given value to the dominant frequency may be identified as the estimated range. The natural frequency data storage unit 115 stores the data of the estimated range of the natural frequency f, as illustrated in FIG. 10, for example. FIG. 10 illustrates an example of data stored in a natural frequency data storage unit.

Figure 11:
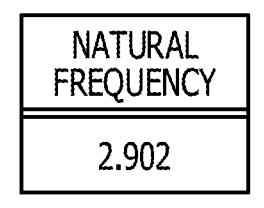

The natural frequency calculating unit 105 calculates the natural frequency of the bridge 7 by extrapolation based on dominant frequencies included in the estimated range of the natural frequency among the dominant frequencies of the respective frequency spectra and speeds corresponding to the dominant frequencies included in the estimated range (operation S11). The natural frequency calculating unit 105 stores the calculated natural frequency in the natural frequency data storage unit 115. The natural frequency data storage unit 115 stores the natural frequency as illustrated in FIG. 11, for example. FIG. 11 illustrates an example of data stored in a natural frequency data storage unit.

Figure 12:
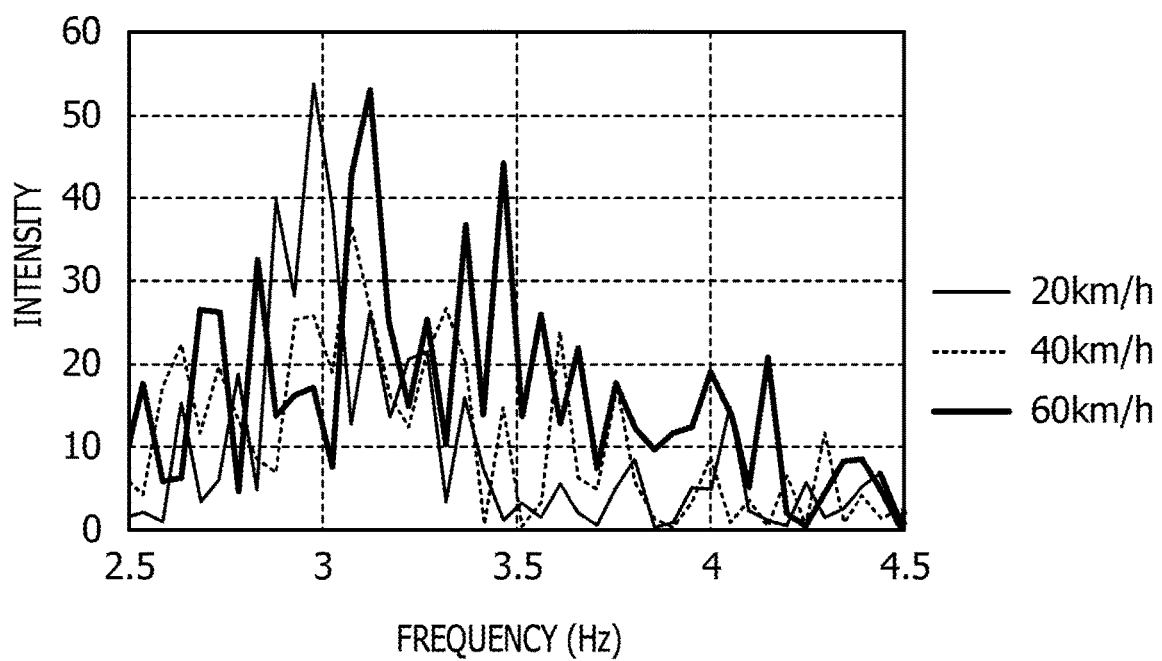
FIG. 12 illustrates an example of calculation of a natural frequency.
Figure 14:
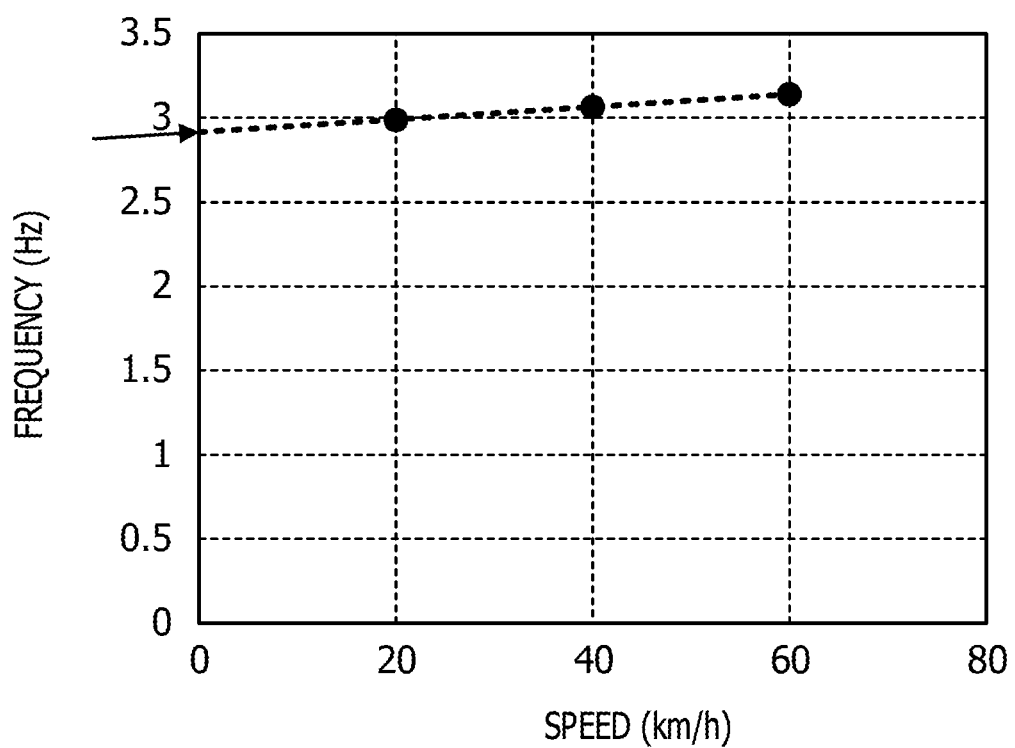
FIG. 14 illustrates an example of calculation of a natural frequency.

FIGS. 12 to 14 illustrate an example of calculation of the natural frequency. FIGS. 12 to 14 illustrate processing performed in operation S11 illustrated in FIG. 5. FIG. 12 illustrates parts of the frequency spectra of FIGS. 7A to 7C, the parts corresponding to a frequency range of 2.5 Hz to 4.5 Hz. As is understood from FIG. 12, the dominant frequencies at the respective speeds may not necessarily coincide with each other. Numerical values are, for example, illustrated in FIG. 13. As an example, the natural frequency of the bridge 7 may be estimated using the dominant frequencies at the respective speeds, and data used for the estimation may be the dominant frequencies included in the range identified in operation S9 and the speeds corresponding to the dominant frequencies. For example, a function expressing relation between dominant frequency and speed may be obtained as illustrated in FIG. 14, and a frequency at a speed of zero, for example, at a time of a stop, for example, a frequency indicated by an arrow in FIG. 14 may be identified as the natural frequency by the obtained function.

The output unit 107 reads the natural frequency calculated in operation S11 from the natural frequency data storage unit 115. The output unit 107 outputs, to the display device of the information processing device 1, for example, output data including the read frequency and the natural frequency of the bridge 7 with no defect, for example, a natural frequency as a physical property value (operation S13). The processing is ended. An operator of the information processing device 1 may verify whether or not the bridge 7 is sound.

As described above, even when dominant frequency changes according to speed, in the case where dominant frequencies are included in the estimated range, the dominant frequencies are used as data, and a proper natural frequency is calculated by extrapolation. A change in the natural frequency which change occurs due to damage to the bridge 7, for example, may be very small. However, because averaging decreases the values of peaks resulting from disturbances, the dominant frequency may be identified easily.

For example, in FIG. 11 of the non-patent document, the natural frequency is considered to be approximately 2.55 Hz, while a shift in dominant frequency of each span is 0.1 Hz or less. Thus, there is a small degree of shift in dominant frequency, and it is difficult to determine whether the shift is caused by difference in speed or damage to the bridge 7. According to the above-described method, for example, the natural frequency may be calculated properly.

Because no sensor is installed on the bridge 7, the time taken to complete evaluation may be shortened, and cost involved in the evaluation may be reduced.

Figure 15:
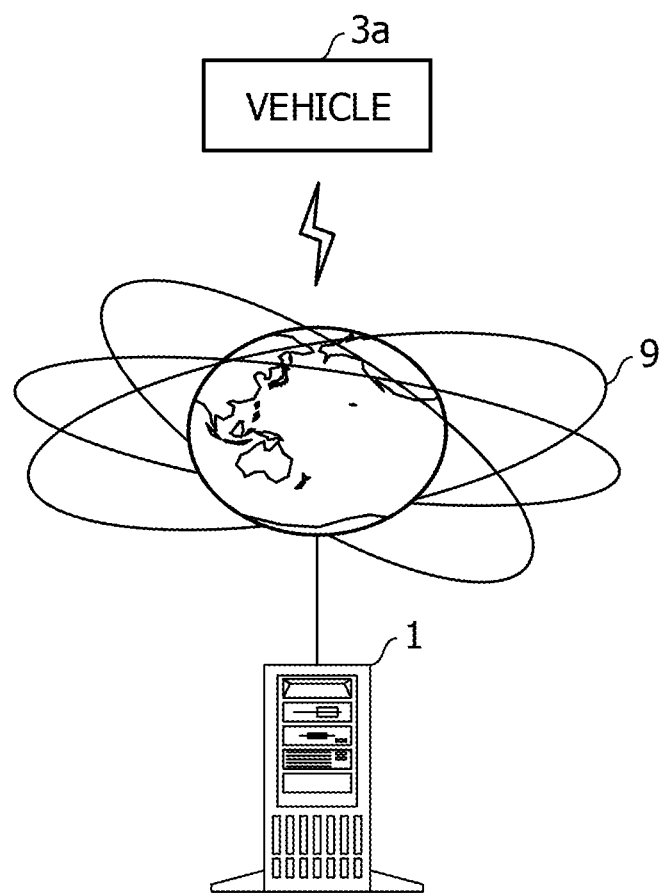
FIG. 15 illustrates an example of a network configuration.

FIG. 15 illustrates an example of a network configuration. As illustrated in FIG. 15, for example, measurement is performed by one vehicle 3*a*. When the vehicle 3*a* travels on the bridge 7 a plurality of times at different speeds, for example, acceleration data is generated for the plurality of speeds. The natural frequency of the bridge 7 may be estimated also by such a method.

The functional block configuration of the above-described information processing device 1, for example, may not coincide with an actual program module configuration.

The above-described data configuration is an example, and does not have to be the configuration as described above. Also, in the above processing flow, the order of processing may be interchanged as long as a processing result is unchanged. Further, processing may be performed in parallel.

The structure may be a bridge. The above processing may be performed for another structure.

When the frequency of a disturbance is known in advance, the peak of the frequency may be removed from the frequency spectra.

In the above description, the speed of the vehicle 3*a* is 60 kilometers per hour (km/h), the speed of the vehicle 3*b* is 40 kilometers per hour (km/h), and the speed of the vehicle 3*c* is 20 kilometers per hour (km/h). However, the vehicles 3*a* to 3*c* may travel at speeds other than such speeds.

FIG. 16 illustrates an example of a hardware configuration of a computer. The information processing device 1 may be a computer device. As illustrated in FIG. 16, coupled to each other via a bus 2519 are a memory 2501, a CPU 2503, an HDD 2505, a display control unit 2507 coupled to a display device 2509, a drive device 2513 for a removable disk 2511, an input device 2515, and a communication control unit 2517 for coupling to a network. An operating system (OS) and an application program for performing the above-described processing are stored on the HDD 2505, and are read from the HDD 2505 into the memory 2501 when executed by the CPU 2503. The CPU 2503 controls the display control unit 2507, the communication control unit 2517, and the drive device 2513 according to processing contents of the application program to make the display control unit 2507, the communication control unit 2517, and the drive device 2513 perform given operations. Data in a process of being processed is stored mainly in the memory 2501, but may be stored on the HDD 2505. The application program is, for example, distributed in a state of being stored on the computer readable removable disk 2511, and installed from the drive device 2513 onto the HDD 2505. The application program may be installed onto the HDD 2505 via the network such as the Internet and the communication control unit 2517. Such a computer device implements various kinds of functions described above when hardware such as the CPU 2503, the memory 2501, and the like and programs such as the OS and the application program cooperate with each other organically.

An estimating method includes: (A) generating a plurality of frequency spectra based on data measured during movement on a structure at a plurality of speeds; (B) identifying a range of a natural frequency of the structure based on the generated plurality of frequency spectra; (C) calculating the natural frequency based on dominant frequencies included in the identified range among dominant frequencies of the plurality of frequency spectra and speeds when the dominant frequencies included in the identified range are measured.

Accuracy of estimation of the natural frequency may be improved by using the dominant frequencies included in the range of the calculated natural frequency.

The identifying of the range may include: (b1) calculating an average or a sum total of the plurality of frequency spectra; (b2) identifying a dominant frequency from the calculated average or the calculated sum total; and (b3) identifying the range of the natural frequency in which an absolute value of a difference from the identified dominant frequency is less than a given value. The calculation of the average or the sum total decreases the values of peaks resulting from disturbances. Thus, it may become easy to identify the dominant frequency.

The measured data may be acceleration data. The generating of the plurality of frequency spectra may include (a1) performing a fast Fourier transformation on the acceleration data. The frequency spectra may be calculated properly.

The data may be measured when one measuring device moves on the structure a plurality of times or when a plurality of measuring devices move on the structure at respective different speeds.

The structure may be a bridge.

The calculating of the natural frequency may include (c1) calculating the natural frequency by obtaining a frequency at a speed of zero by extrapolation based on the dominant frequencies included in the identified range among the dominant frequencies of the plurality of frequency spectra and the speeds when the dominant frequencies included in the identified range are measured.

The above-described estimating device includes: (D) a generating unit, for example, the spectrum generating unit 103, configured to generate a plurality of frequency spectra based on data measured during movement on a structure, for example, the bridge 7, at a plurality of speeds; and (E) a calculating unit, for example, the natural frequency calculating unit 105, configured to identify a range of a natural frequency of the structure based on the generated plurality of frequency spectra, and calculate the natural frequency based on dominant frequencies included in the identified range among dominant frequencies of the plurality of frequency spectra and speeds when the dominant frequencies included in the identified range are measured.

A program for making a computer perform processing based on the above-described method may be generated. The program is, for example, stored in a computer readable storage medium or a storage device such as a flexible disk, a compact disc read-only memory (CD-ROM), a magneto-optical disk, a semiconductor memory, or a hard disk. Intermediate processing results may be temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such, for example, recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An estimating method, comprising:
   acquiring, during movements on a structure by one or more objects in which one or more acceleration sensors and one or more speed sensors are mounted respectively at a plurality of speed, acceleration data and speed data which are measured by the one or more acceleration sensors and the one or more speed sensors respectively;
   generating, by a computer, a plurality of frequency spectra corresponding to the respective acceleration data based on the acceleration data;
   calculating an average or a sum total of the plurality of frequency spectra;
   specifying a frequency corresponding to a maximum spectral intensity in the average or the sum total of the plurality of frequency spectra as a dominant frequency;
   identifying a range of a natural frequency of the structure based on the dominant frequency; and
   calculating the natural frequency based on one or more dominant frequencies included in the range among dominant frequencies of the plurality of frequency spectra and the speed data corresponding to the one or more dominant frequencies.

2. The estimating method according to claim 1, wherein the identifying of the range includes identifying the range in which an absolute value of a difference from the dominant frequency is less than a given value.

3. The estimating method according to claim 1, wherein the one or more objects are vehicles which travel on the structure at different speeds.

4. The estimating method according to claim 1, wherein the generating of the plurality of frequency spectra includes performing a fast Fourier transformation on the acceleration data.

5. The estimating method according to claim 1, wherein the acceleration data and the speed data are measured when one measuring device corresponding to the one or more objects moves on the structure a plurality of times or when a plurality of measuring devices corresponding to the one or more objects move on the structure at respective different speeds.

6. The estimating method according to claim 1, wherein the structure is a bridge.

7. The estimating method according to claim 1, wherein the calculating of the natural frequency includes calculating the natural frequency by obtaining a frequency at a speed of zero by extrapolation based on the one or more dominant frequencies included in the range among the dominant frequencies of the plurality of frequency spectra and the speed data corresponding to the one or more dominant frequencies.

8. An information processing device, comprising:
   a memory configured to store a estimating program; and
   a processor coupled to the memory and configured to preform operations based on the estimating program, wherein the operations includes:
   acquiring, during movements on a structure by one or more objects in which one or more acceleration sensors and one or more speed sensors are mounted respectively at a plurality of speed, acceleration data and speed data which are measured by the one or more acceleration sensors and the one or more speed sensors respectively;
   generating a plurality of frequency spectra corresponding to the respective acceleration data based on the acceleration data;
   calculating an average or a sum total of the plurality of frequency spectra;
   specifying a frequency corresponding to a maximum spectral intensity in the average or the sum total of the plurality of frequency spectra as a dominant frequency;
   identifying a range of a natural frequency of the structure based on the dominant frequency; and calculating the natural frequency based on one or more dominant frequencies included in the range among dominant frequencies of the plurality of frequency spectra and the speed data corresponding to the one or more dominant frequencies.

9. The information processing device according to claim 8, wherein the identifying of the range includes identifying the range in which an absolute value of a difference from the specific dominant frequency is less than a given value.

10. The information processing device according to claim 8, wherein the one or more objects are vehicles which travel on the structure at different speeds.

11. The information processing device according to claim 8, wherein the generating of the plurality of frequency spectra includes performing a fast Fourier transformation on the acceleration data.

12. The information processing device according to claim 8, wherein the acceleration data and the speed data are is measured when one measuring device corresponding to the one or more objects moves on the structure a plurality of times or when a plurality of measuring devices corresponding to the one or more objects move on the structure at respective different speeds.

13. The information processing device according to claim 8, wherein the structure is a bridge.

14. The information processing device according to claim 8, wherein the calculating of the natural frequency includes calculating the natural frequency by obtaining a frequency at a speed of zero by extrapolation based on the one or more dominant frequencies included in the range among the dominant frequencies of the plurality of frequency spectra and the speed data corresponding to the one or more dominant frequencies.

15. A non-transitory computer-readable recording medium storing a estimating program which causes a computer to perform operations, the operations comprising:

acquiring, during movements on a structure by one or more objects in which one or more acceleration sensors and one or more speed sensors are mounted respectively at a plurality of speed, acceleration data and speed data which are measured by the one or more acceleration sensors and the one or more speed sensors respectively;

generating a plurality of frequency spectra corresponding to the respective acceleration data based on the acceleration data;

calculating an average or a sum total of the plurality of frequency spectra;

specifying a frequency corresponding to a maximum spectral intensity in the average or the sum total of the plurality of frequency spectra as a dominant frequency;

identifying a range of a natural frequency of the structure based on the dominant frequency; and calculating the natural frequency based on one or more dominant frequencies included in the range among dominant frequencies of the plurality of frequency spectra and the speed data corresponding to the one or more dominant frequencies.

16. The recording medium according to claim 15, wherein the identifying of the range includes identifying the range in which an absolute value of a difference from the specific dominant frequency is less than a given value.

17. The recording medium according to claim 15, wherein the one or more objects are vehicles which travel on the structure at different speeds.

18. The recording medium according to claim 15, wherein the generating of the plurality of frequency spectra includes performing a fast Fourier transformation on the acceleration data.

19. The recording medium according to claim 15, wherein the acceleration data and the speed data are is measured when one measuring device corresponding to the one or more objects moves on the structure a plurality of times or when a plurality of measuring devices corresponding to the one or more objects move on the structure at respective different speeds.

20. The recording medium according to claim 15, wherein the calculating of the natural frequency includes calculating the natural frequency by obtaining a frequency at a speed of zero by extrapolation based on the one or more dominant frequencies included in the range among the dominant frequencies of the plurality of frequency spectra and the speed data corresponding to the one or more dominant frequencies.

* * * * *